(12) United States Patent
Ganapathiappan et al.

(10) Patent No.: US 8,894,194 B2
(45) Date of Patent: Nov. 25, 2014

(54) INK-JET INKS INCLUDING SELF CROSS-LINKABLE LATEX PARTICLES

(75) Inventors: Sivapackia Ganapathiappan, Los Altos, CA (US); Howard S. Tom, San Jose, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 13/379,960

(22) PCT Filed: Jun. 26, 2009

(86) PCT No.: PCT/US2009/048933
§ 371 (c)(1), (2), (4) Date: Dec. 21, 2011

(87) PCT Pub. No.: WO2010/151266
PCT Pub. Date: Dec. 29, 2010

(65) Prior Publication Data
US 2012/0092412 A1    Apr. 19, 2012

(51) Int. Cl.
*C09D 11/00* (2014.01)
*C09D 11/30* (2014.01)
*C08F 212/08* (2006.01)

(52) U.S. Cl.
CPC ............... *C09D 11/30* (2013.01); *C08F 212/08* (2013.01)
USPC ........................................................ 347/100

(58) Field of Classification Search
CPC ... C09D 11/30; C09D 11/322; B41M 5/5218; B41M 5/506; C09J 175/08; B41J 2/01
USPC .......................................................... 347/100
See application file for complete search history.

(56) References Cited

U.S. PATENT DOCUMENTS

| | | | |
|---|---|---|---|
| 6,437,037 B1 * | 8/2002 | Hutter | 524/460 |
| 6,848,777 B2 | 2/2005 | Chen et al. | |
| 2003/0119943 A1 | 6/2003 | Tucker et al. | |
| 2004/0131855 A1 | 7/2004 | Ganapathiappan | |

(Continued)

FOREIGN PATENT DOCUMENTS

| | | |
|---|---|---|
| EP | 0758673 | 2/1997 |
| EP | 1393922 | 3/2004 |

(Continued)

OTHER PUBLICATIONS

European Search Report dated Dec. 17, 2013 for Application No./Patent No. 09846639.4-1302/2445978, PCT/US2009048933, Applicant Hewlett-Packard Development Company, L.P.

*Primary Examiner* — Laura Martin

(57) ABSTRACT

The present disclosure includes compositions, methods, and systems including an ink-jet ink comprising a liquid vehicle, a colorant dispersed or dissolved in a liquid vehicle, and self cross-linkable latex particles dispersed in the liquid vehicle. The self cross-linkable latex particle can have at least 0.1 wt % of the self cross-linkable monomer on the surface of the self cross-linkable latex particle providing cross-linking sites on the surface of the self cross-linkable latex particle, and can form an intra- and inter-particle cross-linked latex polymer film after printing the ink-jet ink on a substrate and upon at least partial depletion of the liquid vehicle or a liquid vehicle component.

17 Claims, 1 Drawing Sheet

(56) References Cited

U.S. PATENT DOCUMENTS

| | | |
|---|---|---|
| 2006/0083870 A1 | 4/2006 | Chen |
| 2006/0083871 A1 | 4/2006 | Chen |
| 2006/0135647 A1 | 6/2006 | Ichinose et al. |
| 2006/0258777 A1* | 11/2006 | Vincent et al. ............... 523/160 |
| 2008/0165237 A1* | 7/2008 | Yamauchi et al. ............ 347/102 |
| 2008/0182960 A1 | 7/2008 | Ganapathiappan |

FOREIGN PATENT DOCUMENTS

| | | |
|---|---|---|
| EP | 1502759 | 2/2005 |
| EP | 1666270 | 6/2006 |
| WO | WO 2007/103542 | 9/2007 |
| WO | WO 2008/083991 | 7/2008 |

* cited by examiner

INK-JET INKS INCLUDING SELF CROSS-LINKABLE LATEX PARTICLES

BACKGROUND

There are several reasons that ink-jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to thermal ink-jet architecture.

As ink-jet ink applications have advanced, improvement of such printing systems through ongoing research and developmental efforts continue to be sought.

BRIEF DESCRIPTION OF THE DRAWINGS

Additional features and advantages of the invention will be apparent from the detailed description which follows, taken in conjunction with the accompanying figures, which together illustrate, by way of example, features of the invention.

Figure 1:
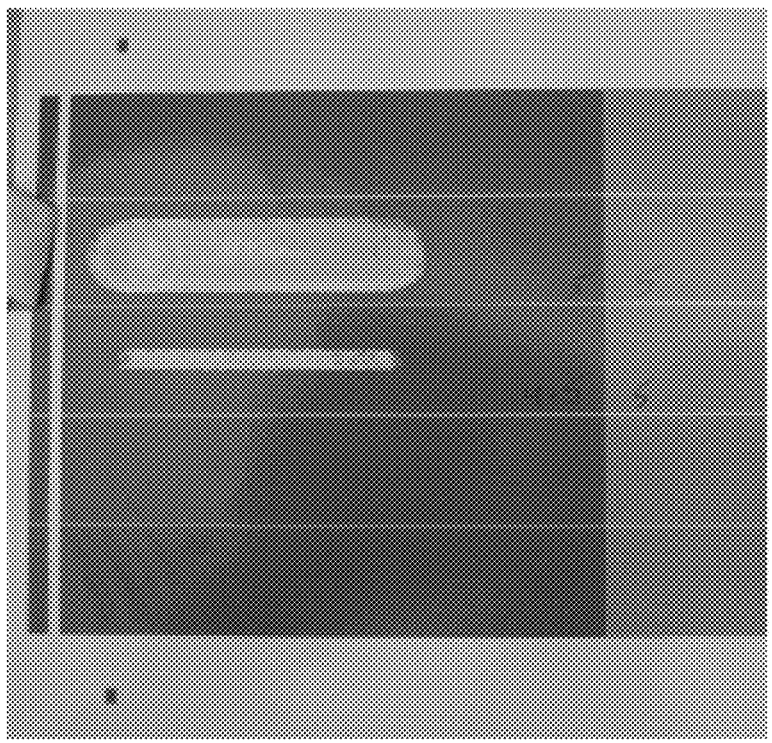
FIG. 1 is a photograph of the result of a window cleaner test (upper) and a dry rub test (lower) of the control ink sample described in Example 3.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an ink-jet ink. Liquid vehicles are well known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, "liquid vehicle component" refers to any solvent, co-solvent, and/or liquid present in a liquid vehicle.

As used herein, "colorant" can include dyes, pigments, and/or other particulates that may be suspended or dissolved in a liquid vehicle prepared in accordance with embodiments of the present disclosure. Dyes are typically water soluble, and therefore, can be desirable for use in some embodiments. However, pigments can also be used in other embodiments. Pigments that can be used include self-dispersed pigments and standard pigments that are dispersed by a separate dispersing agent, e.g., polymer dispersed. Self-dispersed pigments include those that have been chemically surface modified with a small molecule, a polymeric grouping, or a charge. This chemical modification aids the pigment in becoming and/or substantially remaining dispersed in a liquid vehicle. The pigment can also be dispersed by a separate additive, which can be a polymer, an oligomer, or a surfactant, for example, in the liquid vehicle and/or in the pigment that utilizes a physical coating to aid the pigment in becoming and/or substantially remaining dispersed in a liquid vehicle.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "dye" refers to the individual compound, complex, or molecule responsible for an ink's color, and is typically water soluble. This term also includes dyes that affect the overall color of an ink but are not themselves the predominant color. For example, a black ink may contain one or more black dye(s) but may also contain a yellow dye allowing for a more neutral black color.

As used herein, $T_g$ is the glass transition temperature as calculated by the Fox equation: copolymer $T_g = 1/(Wa/(T_gA) + Wb(T_gB) + \ldots)$ where Wa=weight fraction of monomer A in the copolymer and $T_gA$ is the homopolymer $T_g$ value of monomer A, Wb=weight fraction of monomer B and $T_gB$ is the homopolymer $T_g$ value of monomer B, etc.

As used herein, "depletion" refers to the removal of the liquid vehicle or one or more liquid vehicle components from an ink-jet ink after printing causing cross-linking of the self cross-linkable latex particles present in the ink. The removal may be by evaporation, absorption, and/or heating. Additionally, removal may be facilitated by any chemical reactions/interactions including azetropic effects. Additionally, "partial depletion" refers to depletion where at least some of the liquid vehicle or one or more liquid vehicle components remains present (and some is removed by depletion) during the cross-linking of the self cross-linkable latex particles present in the ink.

When referring to an "intra- and inter-particle" cross-linked latex polymer film, what is meant is that both cross-linking with a single particle and cross-linking of adjacent particles both occur with at least a portion of the particles.

When referring to a "comparative" ink-jet ink or ink-jet print, this is defined as including all ingredients as an ink-jet ink or ink-jet print of the present disclosure, except that it does not include self cross-linkable latex particles in the case of an ink, or intra- and inter-particle cross-linked latex polymer film in the case of a print. Everything else in the ink or print is similar, e.g., other monomer content proportions are proportional, concentration of latex is proportional, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that the use of self cross-linkable latex particles in certain ink-jet ink printing systems can provide a durable ink-jet image. In accordance with this, the present disclosure is drawn to compositions, methods, and systems of utilizing self cross-linkable latex particles in ink-jet ink applications. It is noted that when discussing the present compositions, associated methods, or associated systems, each of these discussions can be considered applicable to each of these embodiments, whether or not they are explicitly discussed in the context of that embodiment. Thus, for example, in discussing a self cross-linkable latex particle present in an ink-jet ink, such a self cross-linkable latex particle can also be used in a method of forming an ink-jet ink print, and vice versa.

With these definitions and the above discussion in mind, an ink-jet ink can comprise a liquid vehicle, a colorant dispersed or dissolved in a liquid vehicle, and self cross-linkable latex particles dispersed in the liquid vehicle. The self cross-linkable latex particles can comprise i) at least one hydrophobic monomer, ii) at least one acidic monomer, and iii) at least one self cross-linkable monomer; the at least one self cross-linkable monomer including at least one keto group, and having the general formula:

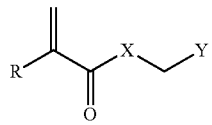

Formula I where R is H or $CH_3$; X is O or NH; Y is $CH_2OH$ or a ring structure containing at least one hetero atom. Additionally, the self cross-linkable latex particle can have at least 0.1 wt % of the self cross-linkable monomer at the surface of the self cross-linkable latex particle providing cross-linking sites on the surface of the self cross-linkable latex particle. The cross-linking sites can form an intra- and inter-particle cross-linked latex polymer film after printing the ink-jet ink on a substrate and upon at least partial depletion of the liquid vehicle or a liquid vehicle component.

A method of forming an ink-jet ink print can comprise printing the ink-jet ink composition described above on a substrate, and forming an intra- and inter-particle cross-linked latex polymer film upon at least partial depletion of the liquid vehicle or a liquid vehicle component.

An ink-jet printing system can comprise a substrate, the ink-jet ink composition described above, and an ink-jet printer having a reservoir containing the ink-jet ink composition, the printer including an ink-jet printhead configured to eject the ink-jet ink composition onto the substrate. Additionally, the ink-jet ink composition can be formulated to form an intra- and inter-particle cross-linked latex polymer film after printing the ink-jet ink composition on the substrate and upon at least partial depletion of the liquid vehicle or a liquid vehicle component.

In one embodiment with respect to Formula I, the ring structure can contain at least one hetero atom has one of the following general formulas:

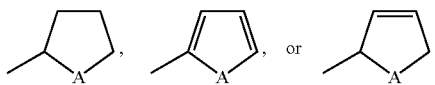

where A is O, NH, or S. In another embodiment, the self cross-linkable monomer can be selected from the group consisting of tetrahydrofurfuryl methacrylate, hydroxyethyl methacrylate, and mixtures thereof.

While the self cross-linkable latex particle can generally have at least 0.1 wt % of the self cross-linkable monomer on the surface of the self cross-linkable latex particle providing cross-linking sites on the surface of the self cross-linkable latex particle, in one embodiment, the self cross-linkable latex particle can have about 0.1 wt % to about 20 wt % of the self cross-linkable monomer on the surface. In another embodiment, the self cross-linkable latex particle can have about 3 wt % to about 7 wt % of the self cross-linkable monomer on the surface.

The hydrophobic monomer can be present in the polymer from up to 98 wt %, e.g., in one embodiment, from 50 wt % to 98 wt %. Hydrophobic monomers that can be polymerized in the high $T_g$ polymer include, without limitation, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Acidic monomers can be present in the polymer from up about 0.1 wt % to about 30 wt %. Acidic monomers that can be used in the high $T_g$ polymer include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Generally, the self cross-linkable latex particles can be prepared by emulsion polymerization techniques such as batch, semi-batch, or mini-emulsion processes. Such self cross-linkable latex particles may be produced using hydrophobic monomers and acidic monomers, along with at least one self cross-linkable monomer. In one embodiment, the self cross-linkable latex particle can be polymerized from at least one hydrophobic monomer, present in an amount up to 98 wt % of the total monomers, and selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and mixtures thereof at least one acidic monomer, present in an amount from about 0.1 wt % to about 30 wt % of the total monomers, and selected from the group consisting of acrylic acid, methacrylic acid, itaconic acid, maleic acid, vinyl benzoic acid, derivatives thereof, and mixtures thereof and at least one self crosslinkable monomer (Formula I), present in an amount from about 0.1 wt % to about 25 wt % of the total monomer. The monomer can be, in one embodiment, selected from the group consisting of tetrahydrofurfuryl methacrylate, hydroxyethyl methacrylate, and mixtures thereof.

Generally, the self cross-linkable latex particles can be present in the ink composition in an amount ranging from about 0.5 wt % to about 40 wt %. In one embodiment, the self cross-linkable latex particles can be present in the ink composition in an amount ranging from about 3 wt % to about 6 wt %. As discussed above, the present ranges include all sub-ranges. For example, the self cross-linkable latex particles can be present in the ink composition from about 1 wt % to about 15 wt %, about 1 wt % to about wt %, about 3 wt % to about 40 wt %, about 3 wt % to about 15 wt %, etc.

Additionally, the self cross-linkable latex particles can have a $T_g$ ranging from about −40° C. to about 125° C. In one embodiment, the $T_g$ of the self cross-linkable latex particles can range from about 15° C. to about 45° C. As discussed above, the present ranges include sub-ranges. For example, the self cross-linkable latex particles can have a $T_g$ from about 0° C. to about 75° C., about 0° C. to about 45° C., about 15° C. to about 75° C., about 20° C. to about 40° C., etc.

Generally, the self-cross linkable particles, upon printing on a media substrate, can form an intra- and inter-particle cross-linked latex polymer film upon depletion or partial depletion of the liquid vehicle or a liquid vehicle component. As discussed herein, the removal can be caused by various means including evaporation, heating, absorption, etc. In one embodiment, the depletion or partial depletion can be caused by evaporation of the liquid vehicle or a liquid vehicle component or can be caused by heating of the liquid vehicle or a liquid vehicle component. In another aspect, the printed ink can be heated. The heating can be to a temperature sufficient to cause at least partial depletion of the liquid vehicle or a liquid vehicle component. In one embodiment, the printed ink can be heated to a temperature of at least 70° C. In another embodiment, the printed ink can be heated to a temperature of at least 50° C. As discussed above, the present ranges include sub-ranges. For example, the printed ink can be heated to a temperature of at least 30° C., at least 40° C., at least 60° C., etc.

As discussed above, the cross-linking may begin substantially immediately upon printing, e.g., a few seconds after printing as the liquid vehicle or a liquid vehicle component begins to deplete, e.g., evaporate. It is to be further understood that the cross-linking generally continues to occur for a time period ranging from about 2 seconds to about 24 hours. In an embodiment, this time period ranges from about 2 seconds to about 2 hours.

Additionally, the liquid vehicle can include a co-solvent that enhances the depletion. In one embodiment, the ink can contain a volatile organic co-solvent having a boiling point of less than 100° C. In another embodiment, the volatile organic co-solvent can have a boiling point of less than 75° C. In yet another embodiment, the volatile organic co-solvent can have a boiling point of less than 50° C. Examples of volatile co-solvents include, without limitation, 2-pyrrolidone, N-methylpyrrolidone, 1,5-pentanediol, 1,6-hexanediol, 1,5-hexanediol and propylene glycol dimethyl ether, and mixtures thereof. Further, the liquid vehicle can include a mixture of co-solvents that enhance depletion. In one embodiment, the liquid vehicle can include at least two co-solvents that form a positive azeotrope; i.e., where the boiling point of the azeotrope is less than the boiling point of either of the individual co-solvents that form the azeotrope.

As mentioned, the durability discussed herein is achieved by cross-linking of the self cross-linkable latex particles that takes place after ink-jet printing while the liquid vehicle or liquid vehicle component in the ink is being depleted. In one embodiment, the ink-jet ink print can exhibit increased durability relative to an ink-jet ink print not including the intra- and inter-particle cross-linked latex polymer film. The increased durability can include an improvement in highlighter smearfastness, rub resistance, wet smudgefastness, solvent resistance, or combinations thereof. The relative comparison generally involves comparing the present inks having the self cross-linkable latex particles to a comparison ink that does not have self cross-linkable particles, and therefore does not form the intra- and inter-particle cross-linked latex polymer film. The comparative ink can have the same general components as the inks of the present disclosure except for the self cross-linkable particles, i.e. the comparative ink includes latex polymer without copolymerized self-crosslinkable monomer where the other monomer concentrations are proportionally increased. In this case, the difference between the present inks and the comparative inks is due to the presence of the self cross-linkable monomer in the present latex particles and the absence of the self cross-linkable monomers in the latex particles of the comparative ink, allowing for an objective comparison as to the increased durability of the inks of the present disclosure over a comparative ink.

The instant disclosure also relates to the improvement in durability of ink-jet inks These durability improvements encompass: improved highlighter smearfastness, rub resistance, wet smudgefastness, and solvent resistance, e.g., as represented by the rub resistance test and window cleaner test described below. Generally, rub resistance and window cleaner tests are more aggressive tests, as compared to more typical highlighter smearfastness and wet smudgefastness tests, i.e. the solvent used in the window cleaner test is more aggressive than highlighter fluid and the rub resistance test uses a more abrasive material than a highlighter tip. As such, ink-jet inks exhibiting better performance in window cleaner and rub resistance tests should exhibit even better performance in highlighter smearfastness and wet smudgefastness tests.

Additionally, it is noted that self cross-linkable latex particles described herein can be further stabilized by addition of surfactants. As such, in one embodiment, the latex particles can further comprise the addition of a reactive surfactant during the polymerization process. Generally, the reactive surfactant contains hydrophobic moieties that can be covalently bound to the surface of the polymeric particles. Additionally, such a reactive surfactant can be incorporated during the polymerization via appropriate organic groups, e.g., a vinyl group, such that the surface of the latex particles contains the reactive surfactant. Generally, the reactive surfactant can contain hydrophilic groups that allow the polymeric particles to be dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethelyene oxide, imidazole and amido groups. As such, in one embodiment, the reactive surfactants can be functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAXEMUL® (anionic phosphate ester) reactive surfactants commercially available from Uniqema of the Netherlands. Suitable grades of some of the materials listed above may include HITENOL BC-20, NOIZEN RN-30, TREM LT-40, and MAXEMUL 6106 and 6112.

The ink-jet ink compositions of the present disclosure may also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof. A non-limiting example of a suitable metal material is a metal in foil form made from, for example, at least one of aluminum, silver, tin, copper, alloys thereof, and/or mixtures thereof.

With these parameters in place regarding some of the possible self cross-linkable latex particles that can be formed, a discussion of dispersion fluids, e.g., inks, etc., is useful to exemplify how these polymers can be implemented for use in accordance with an embodiment of the present disclosure. Typically, inks can include a colorant dispersed in a liquid vehicle. Typical liquid vehicle formulation that can be used with the self cross-linkable latex particles described herein can include water, and optionally, one or more co-solvents present in total at from 0.1 wt % to 30 wt %, depending on the jetting architecture. Further, one or more non-ionic, cationic, and/or anionic surfactant can optionally be present, ranging from 0.01 wt % to 10.0 wt %. The balance of the formulation can be purified water, or other vehicle components known in the art, such as biocides, viscosity modifiers, materials for pH adjustment, sequestering agents, preservatives, and the like. In one embodiment, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0 wt % to 10.0 wt %. It is to be noted that the surfactant that is described as being usable in the liquid vehicle is not the same as the surfactant that is described as being adhered to the surface of the latex particles, though many of the same surfactants can be used for either purpose.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

EXAMPLES

The following examples illustrate embodiments of the disclosure that are presently known. Thus, these examples should not be considered as limitations of the disclosure, but are merely in place to teach how to make compositions of the present disclosure. As such, a representative number of compositions and their method of manufacture are disclosed herein.

Example 1

Synthesis of Self Cross-linkable Latex Particles

Monomers of styrene (332 g), tetrahydrofurfuryl methacrylate (60 g), and methacrylic acid (8 g) are emulsified in water (160 ml) containing reactive surfactant MAXEMUL 6106 (2 g) from Uniquema. An initiator solution is prepared by dissolving potassium persulfate (1.39 g) in water (160 ml). Water (1160 ml) is heated to 90° C., at which time 32 ml of the initiator solution is added. This is followed by the simultaneous addition of the emulsified monomer solution and the remaining initiator solution added over a period of 33 minutes and 35 minutes, respectively. This reaction mixture is maintained at a temperature of 90° C. for a period of about 2.5 hours and then cooled to ambient temperature. The pH is then adjusted to 8.5 with 50% potassium hydroxide solution. The reaction mixture is filtered with 200 mesh filter to obtain self cross-linkable latex particles in about 20.4 wt % solid.

Example 2

Preparation of Ink with the Self Cross-linkable Latex Particles of Example 1

An ink-jettable composition is prepared by dispersing 6 wt % solid of the self cross-linkable latex particles of Example 1 in a liquid vehicle. The liquid vehicle includes 20 wt % organic co-solvent, 0.5 wt % surfactant, 0.5 wt % biocide with the balance being water. The ink also contains about 3% of pigments to impart color.

Example 3

Preparation of Control Ink

A control latex not having self cross-linkable units is prepared similar to Example 1 by removing the tetrahydrofurfuryl methacrylate monomer. In order to compensate for the loss of the tetrahydrofurfuryl methacrylate, the rest of the monomers are increased in their respective amounts (proportionally) maintaining their ratios as listed in Example 1. Once isolated, the control latex is added to the liquid vehicle of Example 2, providing a control ink that has the same makeup of the self cross-linkable latex particle ink except for the ability to self cross-link due to the absence of the tetrahydrofurfuryl methacrylate monomer. Such a control allows for an objective comparison.

Example 4

Durability Tests

The control inks of Example 3 and the ink prepared in accordance with the present disclosure of Example 2 were filled into ink-jet pens and printed with a Hewlett-Packard printer. They were printed on a vinyl media. After printing, the inks were subjected to a rub test and a window cleaner test.

The dry rub test was performed with a linear abraser (specifically a TABER® Linear Abraser-Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the rub test, a stroking head or "wearaser" was attached to the end of the arm of the linear abraser. The stroking head was the size and shape of a pencil eraser and had a contact patch with a diameter of approximately ¼ inch diameter. The stroking head was abrasive (specifically CALIBRASE® CS-10) with a mild to medium abrasive effect. The stroking head was stroked back and forth 10 times on each media sample. The rubbed media samples were judged for color fastness.

The solvent resistance was tested using window cleaner, and was performed with a linear abraser (specifically a TABER® Linear Abraser-Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the window cleaner test, an acrylic finger (specifically from a TABER® Crock Meter Kit) covered by a cloth (specifically a TABER® Crocking Cloth) was attached to the end of the arm of the linear abraser. WINDEX® window cleaner was applied to the cloth, and the cloth-covered end of the acrylic finger was stroked back and forth 5 times on each media sample. The rubbed media samples were judged for color fastness.

After testing, the inks were visually graded as either pass or fail. A passing grade was given if the ink maintained at least 50% coverage of the substrate while a failing grade was given if the ink maintained less than 50% coverage of the substrate.

Figure 2A:
FIG. 2a is a photograph of the result of a window cleaner test of the ink sample having self cross-linkable latex particles described in Example 2.
Figure 2B:
FIG. 2b is a photograph of the result of a dry rub test of the ink sample having self cross-linkable latex particles described in Example 2.

As can be seen in FIGS. 1, 2a, and 2b, the control ink received failing grades for both the rub and window cleaner tests (FIG. 1), while the self cross-linkable latex particle containing ink received passing grades (FIG. 2a,2b) for both tests.

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. An ink-jet ink composition, comprising:
   a) a liquid vehicle;
   b) a colorant dispersed or dissolved in a liquid vehicle; and
   c) self cross-linkable latex particles dispersed in the liquid vehicle, the self cross-linkable latex particles comprising:
      i) at least one hydrophobic monomer,
      ii) at least one acidic monomer, and
      iii) at least one self cross-linkable monomer, the at least one self cross-linkable monomer including at least one keto group, and having the general formula:

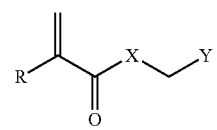

where R is H or $CH_3$; X is O or NH; Y is $CH_2OH$ or a ring structure containing at least one hetero atom;

wherein the self cross-linkable latex particle has at least 0.1 wt % of the self cross-linkable monomer at the surface of the self cross-linkable latex particle providing cross-linking sites on the surface of the self cross-linkable latex particle, and wherein the self cross-linkable latex particles form an intra- and inter-particle cross-linked latex polymer film after printing the ink-jet ink on a substrate and upon at least partial depletion of the liquid vehicle or a liquid vehicle component.

2. The ink-jet ink composition of claim 1, wherein Y is the ring structure, and the ring structure includes at least one hetero atom having one of the following general formulas:

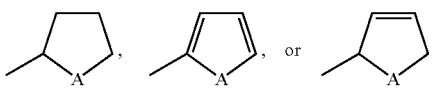

where A is O, NH, or S.

3. The ink jet ink composition of claim 1, wherein the self cross-linkable monomer is selected from the group consisting of tetrahydrofurfuryl methacrylate, hydroxyethyl methacrylate, and mixtures thereof.

4. The ink jet ink composition of claim 1, wherein the self cross-linkable latex particles are present in the ink composition in an amount ranging from about 0.5 wt % to about 40 wt % and have a $T_g$ ranging from about −40° C to about 125° C.

5. The ink jet ink composition of claim 1, wherein the at least one hydrophobic monomer is up to 98 wt % of the monomers and is selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and mixtures thereof;
  wherein the at least one acidic monomer is from about 0.1 wt % to about 30 wt % of the monomers and is selected from the group consisting of acrylic acid, methacrylic acid, itaconic acid, maleic acid, vinyl benzoic acid, derivatives thereof, and mixtures thereof; and
  wherein the at least one self cross-linkable monomer is from about 0.1 wt % to about 25 wt % of the monomers and is selected from the group consisting of tetrahydrofurfuryl methacrylate, hydroxyethyl methacrylate, and mixtures thereof.

6. The ink-jet ink composition of claim 1, wherein the self cross-linkable latex particles are present in the ink composition from about 3 wt% to about 6 wt % and the $T_g$ of the self cross-linkable latex particles ranges from about 15° C. to about 45° C.

7. The ink jet ink composition of claim 1, wherein the at least partial depletion is caused by evaporation of the liquid vehicle or a liquid vehicle component at ambient conditions or by heating of the liquid vehicle or a liquid vehicle component.

8. A method of forming an ink jet ink print, comprising:
  printing the ink-jet ink composition of claim 1 on a substrate; and
  forming an intra- and inter-particle cross-linked latex polymer film upon at least partial depletion of the liquid vehicle or a liquid vehicle component from the ink-jet ink composition printed on the substrate.

9. The method of claim 8, wherein the ink jet ink print exhibits increased durability relative to a comparative ink-jet print which does not include intra- and inter-particle cross-linked latex polymer film.

10. The method of claim 9, wherein the increased durability includes an improvement in each of highlighter smearfastness, rub resistance, wet smudgefastness, and solvent resistance.

11. The method of claim 8, wherein the self cross-linkable latex particles are present in the ink composition from about 0.5 wt % to about 40 wt % and wherein the self cross-linkable monomer is selected from the group consisting of tetrahydrofurfuryl methacrylate, hydroxyethyl methacrylate, and mixtures thereof.

12. The method of claim 8, wherein the partial depletion is caused by evaporation of the liquid vehicle or a liquid vehicle component at ambient conditions or by heating of the liquid vehicle or a liquid vehicle component.

13. An ink-jet printing system, comprising:
  a) a substrate;
  b) the ink-jet ink composition of claim 1; and
  c) an ink-jet printer including a reservoir containing the ink-jet ink composition and an ink-jet printhead configured to eject the ink-jet ink composition onto the substrate;
  wherein the ink-jet ink composition is formulated to form an intra- and inter-particle cross-linked latex polymer film after printing the ink jet ink composition on the substrate and upon at least partial depletion of the liquid vehicle or a liquid vehicle component.

14. The ink jet printing system of claim 13, wherein the self cross-linkable latex particles are present in the ink composition from about 3 wt % to about 6 wt % and the $T_g$ of the self cross-linkable latex particles ranges from about 15° C. to about 45° C.

15. The ink-jet printing system of claim 13, wherein the self cross-linkable monomer is selected from the group consisting of tetrahydrofurfuryl methacrylate, hydroxyethyl methacrylate, and mixtures thereof.

16. The ink-jet ink composition of claim 1, wherein the self cross-linkable latex particle has about 3 wt % to about 7 wt % of the self cross-linkable monomer at the surface of the self cross-linkable latex particle.

17. The ink-jet ink composition of claim 1, wherein the liquid vehicle comprises water and an organic co-solvent having a boiling point of less than 100° C.

* * * * *

UNITED STATES PATENT AND TRADEMARK OFFICE
CERTIFICATE OF CORRECTION

PATENT NO. : 8,894,194 B2  Page 1 of 1
APPLICATION NO. : 13/379960
DATED : November 25, 2014
INVENTOR(S) : Sivapackia Ganapathiappan et al.

It is certified that error appears in the above-identified patent and that said Letters Patent is hereby corrected as shown below:

In the Claims

In column 11, line 21, in Claim 3, delete "ink jet" and insert -- ink-jet --, therefor.

In column 11, line 25, in Claim 4, delete "ink jet" and insert -- ink-jet --, therefor.

In column 11, line 29, in Claim 5, delete "ink jet" and insert -- ink-jet --, therefor.

In column 11, line 55, in Claim 7, delete "ink jet" and insert -- ink-jet --, therefor.

In column 12, line 4, in Claim 8, delete "ink jet" and insert -- ink-jet --, therefor.

In column 12, line 10, in Claim 9, delete "ink jet" and insert -- ink-jet --, therefor.

In column 12, line 36, in Claim 13, delete "ink jet" and insert -- ink-jet --, therefor.

In column 12, line 39, in Claim 14, delete "ink jet" and insert -- ink-jet --, therefor.

Signed and Sealed this
Fifth Day of May, 2015

Michelle K. Lee
*Director of the United States Patent and Trademark Office*